United States Patent Office 3,155,708
Patented Nov. 3, 1964

---

3,155,708
PROCESS FOR MAKING HYDROCARBYLPHOSPHONOTHIONIC ACID MONOARYL ESTERS
John P. Chupp, Kirkwood, and Peter E. Newallis, Crestwood, Mo., assignors to Monsanto Company, a corporation of Delaware
No Drawing. Filed Jan. 26, 1962, Ser. No. 169,130
10 Claims. (Cl. 260—461)

This invention relates to hydrocarbylphosphonothionic acids and particularly to a new and useful method of making hydrocarbylphosphonothionic acids.

In accordance with this invention it has been found that hydrocarbylphosphonothionic acids of the formula

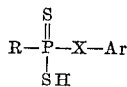

wherein R is a hydrocarbyl radical free of aliphatic unsaturation, wherein X is chalkogen of atomic weight less than 40 (i.e. sulfur or oxygen, preferably oxygen), and wherein Ar is phenyl (i.e. $C_6H_5$) or said phenyl having one or more substituents such as lower alkyl, lower alkoxy, lower alkylthio, bromo, chloro, nitro, trifluoromethyl, or mixtures thereof, can be prepared conveniently and efficiently by reacting at least one phenolic compound of the formula HX—Ar wherein X and Ar have the aforedescribed significance with at least one hydrocarbylthionophosphine sulfide having a ratio of substitutents of phosphorus to sulfur to hydrocarbyl radical R of approximately 1:2:1, the said hydrocarbyl radical R having the aforedescribed significance.

The hydrocarbylthionophosphine sulfide reactants of the method of this invention are in general high melting solids. They are characterized by a ratio of substituents of phosphorus to sulfur to hydrocarbyl radical R of approximately 1:2:1 and are usually represented by the broad formula $(R-PS_2)_n$ or, and preferably, by the formula

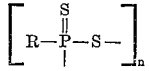

wherein $n$ is a whole number, usually less than 5, and wherein R has the aforedescribed significance, namely a hydrocarbyl radical free of aliphatic unsaturation (i.e. free of olefinic and/or acetylenic unsaturation), as for example the various alkyl, aryl, alkaryl, aralkyl, cycloalkyl, fused carbocyclic aromatic, partially and fully hydrogenated fused carbocyclic aromatic radicals, containing 1 to 18 carbon atoms, exemplary of which are methyl, ethyl, propyl, butyl, amyl, hexyl, heptyl, octyl, decyl, dodecyl, tetradecyl, octadecyl, cyclopentyl, cyclohexyl, cycloheptyl, methylcyclohexyl, cyclohexylmethyl, bicyclohexylyl, phenyl, tolyl, xylyl, cumyl, dodecylphenyl, cyclohexylphenyl, benzyl, phenethyl, phenpropyl, bibenzylyl, benzylphenyl, biphenylyl, naphthyl, tetrahydronaphthyl, anthracyl, phenanthryl, indanyl, indenyl, fluorenyl, etc., and the various isomeric forms thereof containing up to 18 carbon atoms. In general it is preferred that the "hydrocarbyl radical" be phenyl, $C_6H_5$, or an alkyl radical containing 1 to 4 carbon atoms and having at least one hydrogen substituent on the alpha carbon atom (i.e. the primary and secondary alkyl radicals as exemplified by methyl, ethyl, n-propyl, n-butyl, isopropyl, isobutyl, and sec. butyl).

These hydrocarbylthionophosphine sulfide reactants of the method of this invention are prepared by reacting hydrogen sulfide with a hydrocarbylthionophosphonic dichloride of the formula

wherein R has the aforedescribed significance. This reaction is accompanied by the evolution of hydrogen chloride and therefore the overall chemical equation can be set forth as

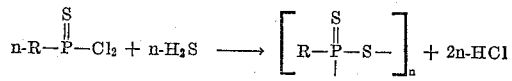

wherein $n$ is a whole number, usually less than 5, and wherein R has aforedescribed significance. The hydrocarbylthionophosphine sulfide product so produced is in many instances a mixture, the component parts of which are characterized by a ratio of substituents of phosphorus to sulfur to hydrocarbyl radical R of approximately 1:2:1 and which satisfy the formula

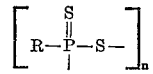

wherein R has the aforedescribed significance and wherein $n$ is a whole number, usually less than 5. Molecular weight determinations via standard ebullioscopic methods in carbon tetrachlorides indicate the hydrocarbylthionophosphine sulfide product is or is predominantly the dimeric form (i.e., $n=2$), the other forms when present usually being the trimeric (i.e., $n=3$) or the tetrameric (i.e., $n=4$) or higher polymeric forms. Each member of the mixture as well as the total mixture or any combination thereof function the same with respect to the phenolic reactant HX—Ar of the method of this invention.

As illustrative of the hydrocarbylthionophosphine sulfifide reactants and their method of preparation is the following:

In each of the following Examples A, B, C, D, E, F, G and H the reaction vessel is a resin flask equipped with an agitator, thermometer, water-cooled reflux condenser or, and preferably for more economic use of hydrogen sulfide a Dry Ice-cooled reflux condenser, and a gas inlet tube. The gas inlet tube is connected in turn to a trap and flowmeter and thence to a hydrogen sulfide source. The outlet of the reflux condenser is connected to a safety trap and thence to a hydrogen halide scrubber. The issuing gas from the scrubber is lead to the flame of a gas burner and the unreacted hydrogen sulfide burned.

EXAMPLE A

*Methylthionophosphine Sulfide*

To the aforedescribed reaction vessel is charged approximately 972 grams of methylthionophosphonic dichloride,

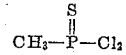

and the charge heated to the reflux temperature (about 160° C.). Hydrogen sulfide is then passed beneath the surface of the dichloride at varying rates in the range of 12 to 30 grams per hour until approximately 407 grams of hydrogen sulfide is added. During this addition the reaction temperature is maintained in the range of about 160 to 215° C. The reaction mass is cooled to room temperature, broken out of the reaction vessel, triturated under pentane, and dried in a vacuum desiccator. The yield of solid product is 98.6% of theory based on the dichloride charged. Analysis: Theory 28.2% P, 58.4% S. Found 27.5% P, 58.4% S. The molecular weight of the solid product (an average of three ebullioscopic molecular weight determinations in carbon tetrachloride) is 226. Since 220 is the theoretical molecular weight of

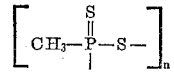

wherein $n$ is 2, the results indicate that the solid product is or is predominantly the dimeric compound (i.e. $n=2$).

EXAMPLE B

*Ethylthionophosphine Sulfide*

To the aforedescribed reaction vessel is charged approximately 100 grams of ethylthionophosphonic dichloride,

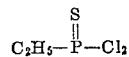

and the charge heated to approximately 175° C. Approximately 101 grams of hydrogen sulfide is then slowly passed beneath the surface of the dichloride over a period of about 11 hours. During this addition period the reaction temperature is maintained in the range of about 165 to about 220° C. The reaction mass is then cooled to room temperature, broken out of the reaction vessel, triturated under pentane, filtered and dried in a vacuum desiccator. The solid product (74.2 grams; 97.5% of theory yield based on dichloride charged) so obtained melts at 142–147° C. The molecular weight of the solid product (an average of three ebullioscopic molecular weight determinations in carbon tetrachloride over a wide range of concentrations to permit extrapolation to zero concentration) is 249. Theoretically the molecular weight of

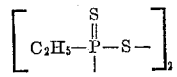

is 248 which indicates the solid product is or is predominantly the dimeric compound. Upon recrystallizing the solid product from chlorobenzene the melting point is 146–148° C. Analysis: Theory 25.0% P. Found 24.2% P.

EXAMPLE C

*Isopropylthionophosphine Sulfide*

To the aforedescribed reaction vessel is charged approximately 149 grams of isopropylthionophosphonic dichloride,

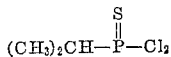

and the charge heated to approximately 170° C. Approximately 96 grams of hydrogen sulfide is passed beneath the surface of the dichloride at a rate of approximately 0.2 gram per minute. During this addition period the reaction temperature is maintained in the range of from about 170° C. to about 210° C. The reaction mass is then cooled to room temperature, broken out of the reaction vessel, washed with hexane and dried in a vacuum desiccator. The solid product (106 grams; 91.5% of theory yield based on dichloride charged) so obtained melts in the range of 160–175° C. The molecular weight of the solid product (an average of three ebullioscopic molecular weight determinations in carbon tetrachloride) is 298 which indicates it is composed largely of the dimeric compound, i.e.

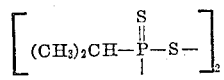

the residual components being higher polymeric forms of the dimeric compound. Upon recrystallizing the reaction product from chlorobenzene the melting point is 180–181.5° C. Analysis: Theory 22.4% P, 46.4% S. Found 21.8% P, 46.5% S.

EXAMPLE D

*n-Butylthionophosphine Sulfide*

To the aforedescribed reaction vessel is charged approximately 250 grams of n-butylthionophosphonic dichloride,

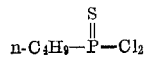

and the charge heated to approximately 170° C. Approximately 230 grams of hydrogen sulfide is then passed beneath the surface of the dichloride at a rate of approximately 0.2 gram per minute. During this addition the reaction temperature is maintained in the range of from about 170° C. The reaction mass is then cooled to room temperature, broken out of the reaction vessel, washed with hexane and dried in a vacuum desiccator. The yield is 181 grams (91% of theory based on the dichloride charged). The molecular weight of the solid product (an average of three ebullioscopic molecular weight determinations in carbon tetrachloride) is 314 which indicates the product is or predominantly is the dimeric compound.

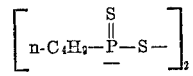

Upon recrystallizing the solid product from chlorobenzene gives a melting point of 105–110° C. Analysis: Theory 20.4% P. Found 20.2% P.

EXAMPLE E

*n-Propylthionophosphine Sulfide*

To the aforedescribed reaction vessel is charged approximately 87 grams of n-propylthionophosphonic dichloride

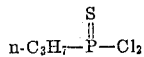

and the charge heated to approximately 170° C. Approximately 250 grams of hydrogen sulfide is then passed beneath the surface of the dichloride at a rate of about 0.2 gram per minute. During this addition the reaction temperature is maintained in the range of from about 170° C. to about 210° C. The reaction mass is then cooled to room temperature, broken out of the reaction vessel, washed with hexane and then dried in a vacuum desiccator. The solid product (68 grams; 79.5% of theory yield based on dichloride charged) so obtained melts in the range of 86–96° C. The molecular weight of the solid product (an average of three ebullioscopic molecular weight determinations in carbon tetrachloride) is 301 which indicates the product is largely the dimeric compound

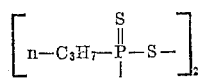

the residual components being higher polymeric forms thereof. Upon recrystallizing the solid product from chlorobenzene the melting point is 97–99° C. Analysis: Theory 22.5% P. Found 21.9% P.

EXAMPLE F

*Phenylthionophosphine Sulfide*

To the aforedescribed reaction vessel is charged approximately 100 grams of phenylthionophosphonic dichloride

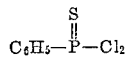

and the charge heated to approximately 235° C. Hydrogen sulfide is then passed beneath the surface of the dichloride at a rate of about 0.33 gram per minute until hydrogen chloride stops evolving. During this addition the reaction temperature is maintained in the range of from about 175 to about 235° C. The reaction mass is then cooled to room temperature and broken out of the reaction vessel, washed with hexane, and dried in a vacuum desiccator to give 70 grams of product which melts in the range of 215–232° C. The molecular weight of the solid product (an average of three ebullioscopic molecular weight determinations in carbon tetrachloride) is 342 which indicates the solid product is or is predominantly the dimeric compound

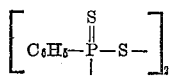

Upon recrystallizing the solid product from chlorobenzene the melting point is 233–243° C. Analysis: Theory 18.0% P, 37.2% S. Found 17.4% P, 36.62% S.

EXAMPLE G

*Cyclohexylthionophosphine Sulfide*

To the aforedescribed reaction vessel is charged approximately 49.8 grams of cyclohexylthionophosphonic dichloride

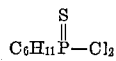

and the charge heated to approximately 200° C. Approximately 200 grams of hydrogen sulfide is then passed beneath the surface of the dichloride at a rate of about 0.2 gram per minute. During this addition the reaction temperature is maintained in the range of from 200 to 215° C. The reaction mass is then cooled to room temperature, broken out of the reaction vessel, triturated under hexane, and dried in a vacuum desiccator. The solid product (86% of theory yield based on dichloride charged) so obtained melts in the range of 138–155° C. The molecular weight of the solid product (an average of three ebullioscopic molecular weight determinations in carbon tetrachloride) is 419 which indicates that the solid product is a mixture of cyclohexylthionophosphine sulfides of the formula

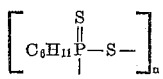

in which mixture the dimeric compound (i.e. $n=2$) predominates, the other component parts being higher polymeric forms thereof. Upon recrystallizing the solid product from chlorobenzene the melting point is 189–192° C. Analysis: Theory 17.5% P, 36.6 S. Found 17.2% P, 36.8% S.

In the preparation of several of the hydrocarbylthionophosphine sulfide reactants for the method of this invention it was found advantageous to include in the initial charge a small amount (e.g. up to about 15% by weight of the dihalide reactant charged) of the desired end product to hasten initial reaction and illustrative of such is the following:

EXAMPLE H

*Methylthionophosphine Sulfide*

To the aforedescribed reaction vessel is charged approximately 972 grams of methyl thiophosphonic dichloride,

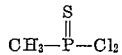

and approximately 100 grams of previously prepared methyl dithiophosphonic acid anhydride,

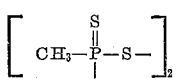

and the charge heated to 153° C. Hydrogen sulfide is then passed beneath the surface of the mass at a rate of about 0.2 gram per minute until hydrogen chloride stops evolving while maintaining the reaction mass at a temperature in the range of about 160 to 215° C. The reaction mass is then cooled to room temperature, broken out of the reaction vessel, triturated under pentane, and dried in a vacuum dessicator. The solid product (794 grams) melts in the range of 200–208° C. The molecular weight of the solid product (an average of three ebullioscopic molecular weight in carbon tetrachloride) is 235 which indicates the solid product is a mixture of materials satisfying the formula

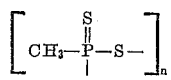

wherein $n$ averages approximately 2.15 and is composed chiefly of the dimeric compound

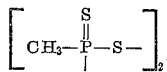

the residual components being higher polymeric forms thereof. The solid product after recrystallizing from chlorobenzene gives a melting point of 206–211° C. and analyzes as follows: Theory 28.2% P, 58.4% S. Found 27.9% P, 58.4% S.

In a similar manner employing the appropriate hydrocarbylthionophosophonic dichloride other hydrocarbylthionophosphine sulfides are prepared, e.g.

2-ethylhexythionophosphine sulfide,
laurylthionophosphine sulfide,
n-octadecylthionophosphine sulfide,
cyclopentylthionophosphine sulfide,
p-tolylthionophosphine sulfide,
n-dodecylphenylthionophosphine sulfide,
benzylthionophosphine sulfide,
p-biphenylylthionophosphine sulfide,
2-naphthylthionophosphine sulfide, and the like, which are operable in preparing the aforedescribed phosphonodithioic acid esters.

The hydrocarbylthionophosphine sulfides of this invention react with the reactant HX—Ar in accordance with the following chemical equation:

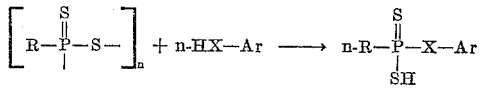

wherein R, X and $n$ have the aforedescribed significance.

It is necessary in the method of this invention that the reaction system be fluid, i.e. maintained above the freezing point of the system. In that the reaction is exothermic in general it is not necessary to apply external heat at the beginning of the reaction, however in general to increase the rate of reaction it is desirable to employ a reaction temperature in the range of from about 40° C. to about 200° C. In instances wherein the reactant HX—Ar is a solid it is advantageous to conduct the reaction in the presence of an inert organic solvent (e.g. benzene, toluene, xylene, hexane, heptane, octane, ethylenedichloride, carbon tetrachloride, etc.). When the HX—Ar reactant is a liquid and the economics permit it has been found desirable to conduct the reaction in the presence of an excess of the said reactant. For storage purposes it is convenient to convert the hydrocarbylphosphonothionic acid to its ammonium salt by sparging an inert organic solvent solution of the phosphonothioic acid with anhydrous ammonia.

The phenolic reactants of the method of this invention include phenol, m-, p- and o-cresols, m-, p- and o-ethylphenols, the xylenols, mesitol, pseudo-cumenol, m-, p- and o-propylphenols, p-cumenol, thymol, carvracol, p-t-butylphenol, p-isoamylphenol, m-, p- and o-chlorophenols, the various dichloro- and trichlorophenols such as 2,4-dichloro- and 2,4,5-trichlorophenols, m-, p- and o-bromophenols, the various dibromo- and tribromophenols such as 2,4-dibromo- and 2,4,6-tribromophenols, the tetrachloro- and pentachlorophenols such as 2,3,4,6-tetrachloro- and pentachlorophenol, m-, p- and o-nitrophenols, the dinitro- and trinitrophenols such as 2,4-dinitrophenol and picric acid, the various lower alkoxy substituted phenols such as guaiacol, p-ethoxyphenol, 3,4-dimethoxyphenol, p-isoamyloxyphenol, the various lower alkylthiophenols such as p-(ethylthio)phenol, p-(n-butylthio)phenol and p-(isoamylthio)phenol, the various mixed phenols such as 5-chloro-guaiacol, 4-nitroguaiacol, 4-nitro-3-trifluoromethylphenol, 2,6-dischloro-4-bromophenol, 2,6-dibromo-4-nitrophenol, 2-nitro-4-methylphenol, 4-nitro-2-methylphenol, 2-nitro-4-chlorophenol, 2-nitro-4-bromophenol, 4-chloro-3,5-xylenol, and the like, and the corresponding thiophenols such as phenyl mercaptan, o-tolyl mercaptan, o-nitrophenyl mercaptain, p-chlorophenyl mercaptan, and the like which satisfy the formula HX—Ar wherein X and Ar have the foregoing significance.

The preferred phenol reactants of the process of this invention are those of the formula

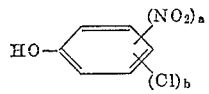

wherein $a$ is an integer from 0 to 2, wherein $b$ is an integer from 0 to 3 and wherein the sum total of $a$ and $b$ is a whole number from 1 to 3. Specific phenols embraced thereby include m-, p- and o-chlorophenols, m-, p- and o-nitrophenols, the various dichlorophenols such as 2,4-dicholorophenol and 3,4-dichlorophenol, the various dinitrophenols such as 2,4-nitrophenol, the various trichlorophenols such as 2,4,5-trichlorophenol and 2,4,6-trichlorophenol, the various mixed phenols such as 2-nitro-4-chlorophenol, 3-chloro-4-nitrophenol, 2,6-dichloro-4-nitrophenol, and the like.

As illustrative of the process of this invention is the following:

EXAMPLE I

To a suitable reaction vessel equipped with an agitator, thermometer, reflux condsenser and dropping funnel is charged 16.5 parts by weight of methylthionophosphine sulfide (the product of Example H). While agitating the contents of the reaction vessel 16.2 parts by weight of m-cresol is added dropwise from the dropping funnel. During this addition the temperature rose to about 50° C. The mass is then heated to about 80° C. and held at 78-80° C. for about forty minutes. The reaction mass is then subjected to vacuum distillation (60° C. at 3 mm.) to remove any volatiles. The residue, 31.5 parts by weight of an amber oil, is O-(3-methylphenyl) methylphosphonodithioic acid. Theory NN 257. Found NN 245.7.

In a suitable reaction vessel is charged 2 parts by weight of O-(3-methylphenyl) methylphosphonodithioic acid and 10 parts by weight of benzene. While agitating this solution at about 25–45° C. anhydrous ammonia is added via a gas sparge. The resulting slurry is cooled to room temperature, filtered and the filter cake washed with benzene. The filter cake is then vacuum dried to give 2 parts by weight of ammonium O-3-methylphenyl methylphosphonodithioate. Analysis: Theory 13.2% P, 27.2% S. Found 12.47% P, 26.13% S.

EXAMPLE II

Employing the procedure of Example I but replacing methylthionophosphine sulfide with an equimolecular amount of ethylthionophosphine sulfide (the product of Example B) there is obtained O-(3-methylphenyl) ethylphosphonodithioic acid.

EXAMPLE III

Employing the procedure of Example I but replacing methylthionophosphine sulfide with an equimolecular amount of phenylthionophosphine sulfide (the product of Example F) there is obtained O-(3-methylphenyl) phenylphosphonodithioic acid.

EXAMPLE IV

Employing the procedure of Example I but replacing m-cresol with an equimolecular amount of guaiacol there is obtained O-(2-methoxyphenyl) methylphosphonodithioic acid.

EXAMPLE V

Employing the procedure of Example I but replacing m-cresol with an equimolecular amount of 5-methyl-2-isopropylphenol) there is obtained O-(5-methyl-2-isopropylphenyl)methylphosphonodithioic acid.

EXAMPLE VI

Employing the procedure of Example I but replacing m-cresol with an equimolecular amount of 4-t-butylphenol there is obtained O-(4-t-butylphenyl) methylphosphonodithioic acid.

EXAMPLE VII

To a suitable reaction vessel equipped with an agitator, thermometer and reflux condenser is charged 4.28 parts by weight of molten phenol. While agitating there is added 5.0 parts by weight of methylthionophosphine sulfide (the product of Example H). The reaction mass is heated up to about 145° C. and then heated at 140–145° C. for 75 minutes. The reaction mass is then stripped of volatiles at 110° C./3 mm., taken up with benzene and the solution of crude O-phenyl methylphosphonodithioic acid sparged with anhydrous ammonia. The slurry so obtained is filtered and the filter cake washed with benzene. The filter cake is then vacuum dried to give ammonium O-phenyl methylphosphonodithioate. Analysis: Theory 14.0% P, 6.34% N. Found 14.07% P, 6.58% N.

EXAMPLE VIII

To a suitable reaction vessel equipped with an agitator, thermometer, dropping funnel and reflux condenser is charged 33 parts by weight of methylthionophosphine sulfide (the product of Example H) and 88 parts by weight of benzene. While agitating a solution of 33 parts by weight of phenyl mercaptan in 88 parts by weight of benzene is added dropwise from the dropping funnel. During this addition the temperature is increased to about 60° C. The reaction mass is agitated for about 30 minutes, filtered, and the filtrate stripped of volatiles at 65° C./10 mm. The residue, 63.1 parts by weight of an oil, is S-phenyl methylphosphonotrithioc acid.

EXAMPLE IX

Employing the procedure of Example VIII but replacing methylthionophosphine sulfide with an equimolecular amount of phenylthionophosphine sulfide (the product of Example F) there is obtained S-phenyl phenylphosphonotrithioic acid.

EXAMPLE X

Employing the procedure of Example VIII but replacing methylthionophosphine sulfide with an equimolecular amount of n-butylthionophosphine sulfide (the product of Example D) there is obtained S-phenyl n-butylphosphonotrithioic acid.

EXAMPLE XI

Employing the procedure of Example VIII but replacing methylthionophosphine sulfide with an equimolecular amount of cyclohexylthionophosphine sulfide (the product of Example G) there is obtained S-phenyl cyclohexylphosphonotrithioic acid.

EXAMPLE XII

Employing the procedure of Example VIII but replacing phenyl mercaptan with an equimolecular amount of 4-chlorophenyl mercaptan there is obtained S-(4-chlorophenyl) methylphosphonotrithioic acid.

EXAMPLE XIII

Employing the procedure of Example VIII but replacing phenyl mercaptan with an equimolecular amount of 4-nitrophenyl mercaptan there is obtained S-(4-nitrophenyl) methylphosphonotrithioic acid.

EXAMPLE XIV

Employing the procedure of Example VIII but replacing phenyl mercaptan with an equimolecular amount of 4-ethoxyphenyl mercaptan there is obtained S-(4-ethoxyphenyl) methylphosphonotrithioic acid.

EXAMPLE XV

Employing the procedure of Example VIII but replacing phenyl mercaptan with an equimolecular amount of 4-ethylthiophenyl mercaptan there is obtained S-(4-ethylthiophenyl) methylphosphonotrithioic acid.

EXAMPLE XV

To a suitable reaction vessel equipped with an agitator, thermometer, and reflux condenser is charged 132 parts by weight of benzene and 19.7 parts by weight of 2,4,5-trichlorophenol. While agitating this solution there is added 11 parts by weight of methylthionophosphine sulfide (the product of Example H). The mass is heated to about 65° C. and maintained at that temperature until the sulfide dissolved. Thereafter the reaction mass is stripped of volatiles at 80° C./5 mm. The residue, an amber oil, is O - (2,4,5 - trichlorophenyl) methylphosphonodithioic acid. Analysis: Theory 34.5% Cl, 10.1% P, 20.7% S. Found 33.83% Cl, 9.84% P, 20.13% S.

EXAMPLE XVII

Employing the procedure of Example XVI but replacing 2,4,5--trichlorophenol with an equimolecular amount of 2,4-dichlorophenol there is obtained O-(2,4-dichlorophenyl) methylphosphonodithioic acid.

EXAMPLE XVIII

Employing the procedure of Example XVI but replacing 2,4,5-trichlorophenol with an equimolecular amount of 3,4-dichlorophenol there is obtained O-(3,4-dichlorophenyl)methylphosphonodithioic acid.

EXAMPLE XIX

Employing the procedure of Example XVI but replacing 2,4,5-trichlorophenol with an equimolecular amount of 2,4,6-trichlorophenol there is obtained O-(2,4,6-trichlorophenyl) methylphosphonodithioic acid.

EXAMPLE XX

Employing the procedure of Example XVI but replacing 2,4,5-trichlorophenol with an equimolecular amount of 2,6-dichloro-4-bromophenol there is obtained O-(2,6-dichloro-4-bromophenyl) methylphosphonodithioic acid.

EXAMPLE XXI

Employing the procedure of Example XVI but replacing 2,4,5-trichlorophenol with an equimolecular amount of 4-chlorophenol there is obtained O-(4-chlorophenyl) methylphosphonodithioic acid.

EXAMPLE XXII

Employing the procedure of Example XVI but replacing 2,4,5-trichlorophenol with an equimolecular amount of 2-chloro-4-methylphenol there is obtained O-(2-chloro-4-methylphenyl) methylphosphonodithioic acid.

EXAMPLE XXIII

Employing the procedure of Example XVI but replacing 2,4,5-trichlorophenol with an equimolecular amount of 5-chloro-guaiacol there is obtained O-(5-chloro-2-methoxyphenyl) methylphosphonodithioic acid.

EXAMPLE XXIV

Employing the procedure of Example XVI but replacing 2,4,5-trichlorophenol with an equimolecular amount of 2-chloro-4-nitrophenol there is obtained O-(2-chloro-4-nitrophenyl) methylphosphonodithioic acid.

EXAMPLE XXV

Employing the procedure of Example XVI but replacing 2,4,5-trichlorophenol with an equimolecular amount of 2,6-dichloro-4-nitrophenol there is obtained O-(2,6-dichloro-4-nitrophenyl) methylphosphonodithioic acid.

EXAMPLE XXVI

Employing the procedure of Example XVI but replacing 2,4,5-trichlorophenol with an equimolecular amount of 2,3,4,6-tetrachlorophenol there is obtained O-(2,3,4,6-tetrachlorophenyl) methylphosphonodithioic acid.

EXAMPLE XXVII

Employing the procedure of Example XVI but replacing 2,4,5-trichlorophenol with an equimolecular amount of 2-nitro-4-chlorophenol there is obtained O-(2-nitro-4-chlorophenyl) methylphosphonodithioic acid.

EXAMPLE XXVIII

Employing the procedure of Example XVI but replacing 2,4,5-trichlorophenol with an equimolecular amount of 2-chloro-4-isoamylphenol there is obtained O-(2-chloro-4-isoamylphenyl) methylphosphonodithioic acid.

EXAMPLE XXIX

Employing the procedure of Example XVI but replacing methylthionophosphine sulfide with an equimolecular amount of phenylthionophosphine sulfide (the product of Example F) there is obtained O-(2,4,5-trichlorophenyl) phenylphosphonodithioic acid.

EXAMPLE XXX

To a suitable reaction vessel equipped with an agitator, thermometer and reflux condenser is charged 20.8 parts by weight of 4-nitrophenol and 22 parts by weight of toluene. While agitating 16.5 parts by weight of methylthionophosphine sulfide (the product of Example H) is added over a forty minute period while gradually increasing the temperature to 80° C. The reaction mass is permitted to stand and thereafter vacuum distilled at 90° C./10 mm. The solid residue, about 37 parts by weight, is O-(4-nitrophenyl) methylphosphonodithioic acid.

A small amount of O-(4-nitrophenyl)) methylphosphonodithioic acid is dissolved in benzene and the solution sparged with anhydrous ammonia. The slurry is filtered and the filter cake dried. The dried solid is ammonium O - (4 - nitrophenyl) methylphosphonodithioate. Analysis: Theory 10.52% N, 11.65% P. Found 10.63% N, 10.95% P.

EXAMPLE XXXI

Employing the procedure of Example XXX but replacing 4-nitrophenol with an equimolecular amount of 2,4-dinitrophenol there is obtained O-(2,4-dinitrophenyl) methylphosphonodithioic acid.

EXAMPLE XXXII

Employing the procedure of Example XXX but replacing 4-nitrophenol with an equimolecular amount of 4-nitroguaiacol there is obtained O-(4-nitro-2-methoxyphenyl) methylphosphonodithioic acid.

EXAMPLE XXXIII

Employing the procedure of Example XXX but replacing 4-nitrophenol with an equimolecular amount of 2-nitro-4-bromophenol there is obtained O-(2-nitro-4-bromophenyl) methylphosphonodithioic acid.

EXAMPLE XXXIV

Employing the procedure of Example XXX but replacing 4-nitrophenol with an equimolecular amount of 2-nitro-4-methylphenol there is obtained O-(2-nitro-4-methylphenyl) methylphosphonodithioic acid.

EXAMPLE XXXV

Employing the procedure of Example XXX but replacing 4-nitrophenol with an equimolecular amount of 3-chloro-4-nitrophenol there is obtained O-(3-chloro-4-nitrophenyl) methylphosphonodithioic acid.

EXAMPLE XXXVI

Employing the procedure of Example XXX but replacing 4-nitrophenol with an equimolecular amount of 3-methyl-4-nitrophenol there is obtained O-(3-methyl-4-nitrophenyl) methylphosphonodithioic acid.

EXAMPLE XXXVII

Employing the procedure of Example XXX but replacing 4-nitrophenol with an equimolecular amount of 3,5-dinitrophenol there is obtained O-(3,5-dinitrophenyl) methylphosphonodithioic acid.

EXAMPLE XXXVIII

Employing the procedure of Example XXX but replacing 4-nitrophenol with an equimolecular amount of 2,6-dimethyl-4-nitrophenol there is obtained O-(2,6-dimethyl-4-nitrophenyl) methylphosphonodithioic acid.

EXAMPLE XXXIX

Employing the procedure of Example XXX but replacing 4-nitrophenol with an equimolecular amount of 3,4-dimethoxyphenol there is obtained O-(3,4-dimethoxyphenyl) methylphosphonodithioic acid.

EXAMPLE XL

Employing the procedure of Example XXX but replacing 4-nitrophenol with an equimolecular amount of 2,4,6-trimethylphenol there is obtained O-(2,4,6-trimethylphenyl) methylphosphonodithioic acid.

EXAMPLE XLI

Employing the procedure of Example XXX but replacing 4-nitrophenol with an equimolecular amount of 4-cumenol there is obtained O-(4-isopropylphenyl) methylphosphonodithioic acid.

EXAMPLE XLII

Employing the procedure of Example XXX but replacing 4-nitrophenol with an equimolecular amount of 2,6-dinitro-4-methylphenol there is obtained O-(2,6-dinitro-4-methylphenyl) methylphosphonodithioic acid.

EXAMPLE XLIII

Employing the procedure of Example XXX but replacing 4-nitrophenol with an equimolecular amount of 2,6-dinitro-4-t-butylphenol there is obtained O-(2,6-dinitro-4-t-butylphenyl) methylphosphonodithioic acid.

EXAMPLE XLIV

Employing the procedure of Example XXX but replacing methylthionophosphine sulfide with an equimolecular amount of phenylthionophosphine sulfide (the product of Example F) there is obtained O-(4-nitrophenyl) phenylphosphonodithioic acid.

EXAMPLE XLV

Employing the procedure of Example XXX but replacing methylthionophosphine sulfide with an equimolecular amount of isopropylthionophosphine sulfide (the product of Example C) there is obtained O-(4-nitrophenyl) isopropylphosphonodithioic acid.

EXAMPLE XLVI

Employing the procedure of Example XXX but replacing methylthionophosphine sulfide with an equimolecular amount of n-butylthionophosphine sulfide (the product of Example D) there is obtained O-(4-nitrophenyl) n-butylphosphonodithioic acid.

EXAMPLE XLVII

Employing the procedure of Example XVI but replacing methylthionophosphine sulfide with an equimolecular amount of n-butylthionophosphine sulfide (the product of Example D) there is obtained O-(2,4,5-trichlorophenyl) n-butylphosphonodithioic acid.

EXAMPLE XLVIII

Employing the procedure of Example XVI but replacing methylthionophosphine sulfide with an equimolecular amount of isopropylthionophosphine sulfide (the product of Example C) there is obtained O-(2,4,5-trichlorophenyl) isopropylphosphonodithioic acid.

EXAMPLE XLIX

Employing the procedure of Example XXX but replacing 4-nitrophenol with an equimolecular amount of 4-nitro-3-trifluoromethylphenol there is obtained O-(4-nitro-3-trifluoromethylphenyl) methylphosphonodithioic acid.

EXAMPLE L

Employing the procedure of Example XVI but replacing 2,4,5-trichlorophenol with an equimolecular amount of 3-trifluoromethylphenol there is obtained O-(3-trifluoromethylphenyl) methylphosphonodithioic acid.

EXAMPLE LI

Employing the procedure of Example XXX but replacing 4-nitrophenol with an equimolecular amount of commercial cresol having a weight ratio of m to p to o isomers being approximately 5 to 3 to 2 there is obtained a mixture of O-cresyl methylphosphonodithioic acids having a weight of O-m-cresyl to O-p-cresyl to O-o-cresyl methylphosphonodithioic acid of approximately 5 to 3 to 2.

EXAMPLE LII

Employing the procedure of Example XXX but replacing 4-nitrophenol with an equimolecular amount of a nitrochlorophenol having a weight ratio of 2-chloro-4-nitrophenol to 2,6-dichloro-4-nitrophenol of approximately 3 to 1 there is obtained a mixture of O-(2-chloro-4-nitrophenyl) and O-(2,6-dichloro-4-nitrophenyl) methylphosphonodithioic acids in a weight ratio of approximately 3 to 1.

Other hydrocarbylphosphonothionic acids prepared in accordance with the process of this invention from the appropriate phenolic compound and the appropriate hydrocarbylthionohosphine sulfide include O-(4-nitrophenyl) n-propylphosphonodithioic acid
O-(4-nitrophenyl) isoamylphonodithioic acid
O-(4-nitrophenyl) (2-ethylhexyl)phosphonodithioic acid
O-(3-chloro-4-nitrophenyl) laurylphosphonodithioic acid
O-(2,4,5-trichlorophenyl) n-octadecylphosphonodithioic acid
O-(3,4-dimethoxyphenyl) laurylphosphonodithioic acid
O-(3-methyl-4-nitrophenyl) n-amylphosphonodithioic acid
O-(2,4-dinitrophenyl) benzylphosphonodithioic acid
O-(4-chlorophenyl) (β-phenethyl)phosphonodithioic acid
O-(4-isoamylthiophenyl) cyclopentylphosphonodithioic acid
O-(2-chloro-4-methoxyphenyl) (2-naphthyl) phosphonodithioic acid
O-(3,4-dichlorophenyl) tetrahydronaphthylphosphonodithioic acid
O-(4-ethylthiophenyl) (4-biphenylyl)phosphonodithioic acid
O-(4-nitrophenyl) terphenylylphosphonodithioic acid
O-(4-nitrophenyl) indanylphosphonodithioic acid
O-(4-nitrophenyl) phenanthrylphosphonodithioic acid
O-phenyl phenylphosphonodithioic acid
O-(4-chlorophenyl) m-tolylphosphonodithioic acid
O-(4-nitrophenyl) (4-ethylphenyl)phosphonodithioic acid
O-(4-nitrophenyl) n-dodecylphenylphosphonodithioic acid
O-(4-nitrophenyl) 3,5-xylylphosphonodithioic acid
S-(4-chlorophenyl) laurylphosphonotrithioic acid
S-(4-nitrophenyl) n-octadecylphosphonotrithioic acid
S-(4-nitrophenyl) (4-biphenylyl)phosphonotrithioic acid S-phenyl (2-naphthyl)phosphonotrithioic acid and the like.

The hydrocarbylphosphonothionic acids described hereinbefore are toxic to a wide variety of insects. They are also useful as intermediates for the preparation of a wide variety of insecticidal phosphonothionates. For example (1) the addition of acrylonitrile to the free acid provides esters of the formula

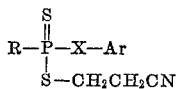

exemplary of which is O-(4-nitrophenyl) S-(2-cyanoethyl) methylphosphonothioate which is effectively toxic to plum curculio, *Conotrachelus nenuphar*.

(2) the addition of diethyl maleate to the free acid provides esters of the formula

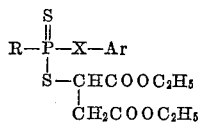

exemplary of which is 1,2-(dicarbethoxy)-2-[S-(O-m-tolyl methylphosphonodithioate)] ethane which exhibited a 90% kill of mosquito larvae, *Aedes aegypti*, at a concentration of 0.6 part per million.

(3) the reaction of a lower alkyl chloride with the ammonium salt of a hydrocarbylphosphonothionic acid provides esters of the formula

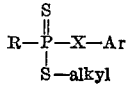

exemplary of which are O-(4-nitrophenyl) S-methyl methylphosphonodithioate and O-(4-nitrophenyl) S-n-butyl methylphosphonodithioate which exhibited 100% kills of mosquito larvae, *Aedes aegypti*, at respective concentrations of 1 and 0.4 part per million.

While this invention has been described with respect to certain illustrative embodiments it is to be understood that it is not so limited and that variations and modifications thereof obvious to those skilled in the art can be made without departing from the spirit or scope of this invention.

The embodiments of the invention, in which an exclusive property or privilege is claimed, are defined as follows:

1. The method of making hydrocarbylphosphonothionic acid monoaryl esters of the formula

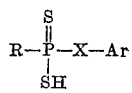

wherein R is hydrocarbyl free of aliphatic unsaturation and having up to 18 carbon atoms and selected from the group consisting of alkyl, C$_{5-7}$ cycloalkyl, methylcyclohexyl, cyclohexylmethyl, bicyclohexyl, pheny, alkylphenyl, cyclohexylphenyl, phenylalkyl, bibenzylyl, benzylphenyl, biphenylyl, naphthyl, tetrahydronaphthyl, anthracyl, phenanthryl, indanyl, indenyl and fluorenyl, wherein X is chalkogen of atomic weight less than 40, and wherein Ar is selected from the group consisting of phenyl and said phenyl having substituents selected from the group consisting of lower alkyl, lower alkoxy, trifluoromethyl, lower alkylthio, bromo, chloro, nitro, which comprises reacting at least one phenolic compound of the formula HX—Ar wherein X and Ar have the aforedescribed significance with at least one hydrocarbylthionophosphine sulfide having a ratio of substituents of phosphorus to sulfur to hydrocarbyl R of approximately 1:2:1, the said hydrocarbyl R having the aforedescribed significance.

2. The method of making O-(chloro substituted phenyl) alkylphosphonodithioic acid esters of the formula

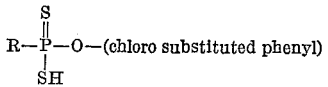

wherein R is alkyl having 1 to 4 carbon atoms and having at least one hydrogen substituent on the alpha carbon atom and wherein the chloro substituted phenyl has from 1 to 3 chlorine substituents which comprises reacting at least one chloro substituted phenol wherein the chloro substituted phenyl grouping thereof has the aforedescribed significance with an alkylthionophosphine sulfide of the formula

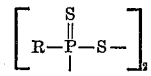

wherein R has the aforedescribed significance.

3. The method of making O-(chlorosubstituted phenyl) phenylphosphonodithioic acid esters of the formula

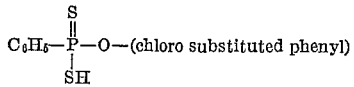

wherein the chloro substituted phenyl has from 1 to 3 chlorine substituents which comprises reacting at least one chloro substituted phenol wherein the chloro substituted phenyl grouping thereof has the aforedescribed significance with a phenylthionophosphine sulfide of the formula

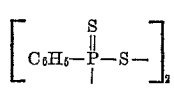

4. A process of claim 2 wherein R is methyl.
5. A process of claim 2 wherein R is ethyl.
6. A process of claim 2 wherein the phenolic reactant is 2,4,5-trichlorophenol.
7. The method of making O-(nitro substituted phenyl) alkylphosphonodithioic acid esters of the formula

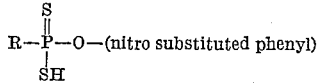

wherein R is alkyl having 1 to 4 carbon atoms and having at least one hydrogen substituent on the alpha carbon atoms and wherein the nitro substituted phenyl has from 1 to 2 nitro substituents which comprises reacting at least one nitro substituted phenol wherein the nitro substituted phenyl grouping thereof has the aforedescribed significance with an alkylthionophosphine sulfide of the formula

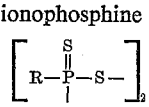

wherein R has the aforedescribed significance.

8. A process of claim 7 wherein the phenolic reactant is 4-nitrophenol.

9. The method of making O-(nitro substituted phenyl) phenylphosphonodithioic acid esters of the formula

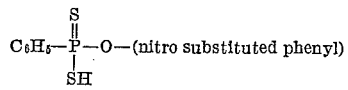

wherein the nitro substituted phenyl has from 1 to 2 nitro substituents which comprises reacting at least one nitro substituted phenol wherein the nitro substituted phenyl grouping thereof has the aforedescribed significance with a phenylthionophosphine sulfide of the formula

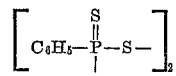

10. A process of claim 8 wherein the phenolic reactant is 4-nitrophenol.

(References on following page)

References Cited in the file of this patent

UNITED STATES PATENTS

| | | |
|---|---|---|
| Re. 22,829 | Rutherford et al. | Jan. 14, 1947 |
| Re. 22,830 | Rutherford et al. | Jan. 14, 1947 |
| 2,346,155 | Denison et al. | Apr. 11, 1944 |
| 2,392,841 | Detrick et al. | Jan. 15, 1946 |
| 2,895,983 | Asseff | July 21, 1959 |
| 2,910,402 | Fairchild | Oct. 27, 1959 |
| 2,967,883 | Dunn et al. | Jan. 10, 1961 |
| 3,032,580 | Schrader | May 1, 1962 |

FOREIGN PATENTS

| | | |
|---|---|---|
| 740,444 | Great Britain | Nov. 16, 1955 |

OTHER REFERENCES

Bayer: "Derwent Belgium Patents Report" (June 22, 1961), PC 19 (abstract of Belgium Patent 595,023, published March 14, 1961).